US008521326B1

(12) United States Patent
Holtje

(10) Patent No.: US 8,521,326 B1

(45) Date of Patent: Aug. 27, 2013

(54) CANISTER ARRANGEMENT FOR REFILLING PHARMACEUTICAL DISPENSER

(75) Inventor: Bruce E. Holtje, Berkshire, NY (US)

(73) Assignee: Innovation Associates, Inc., Johnson City, NY (US)

( * ) Notice: Subject to any disclaimer, the term of this patent is extended or adjusted under 35 U.S.C. 154(b) by 1106 days.

(21) Appl. No.: 12/220,303

(22) Filed: Jul. 23, 2008

(51) Int. Cl.
*G06F 17/00* (2006.01)

(52) U.S. Cl.
USPC .............. 700/242; 700/236; 221/12; 221/103

(58) Field of Classification Search
USPC ................... 221/10, 11, 66, 67, 68, 101, 103, 221/104, 109, 151, 154, 174, 186, 197, 281, 221/287; 700/242, 236
See application file for complete search history.

(56) References Cited

U.S. PATENT DOCUMENTS

| | | | | |
|---|---|---|---|---|
| 2,493,616 | A | 1/1950 | Burns | |
| 5,615,625 | A * | 4/1997 | Cassidy et al. | 109/45 |
| 6,102,855 | A | 8/2000 | Kehr | |
| 6,119,892 | A | 9/2000 | Laurent et al. | |
| 6,684,914 | B2 * | 2/2004 | Gershman et al. | 221/7 |
| 6,786,354 | B2 * | 9/2004 | Black et al. | 221/6 |
| 6,988,634 | B2 | 1/2006 | Varis | |
| 7,317,966 | B2 * | 1/2008 | Takeda et al. | 700/236 |
| 7,344,049 | B2 * | 3/2008 | Daniels et al. | 221/92 |
| 7,797,077 | B2 * | 9/2010 | Hale | 700/236 |
| 7,823,748 | B2 * | 11/2010 | Yuyama et al. | 221/174 |
| 7,840,307 | B2 * | 11/2010 | Mauger et al. | 700/237 |
| 2006/0184271 | A1 | 8/2006 | Loveless | |

* cited by examiner

*Primary Examiner* — Timothy Waggoner
(74) *Attorney, Agent, or Firm* — Mark Levy; Hinman, Howard & Kattell, LLP

(57) ABSTRACT

A canister arrangement for refilling a pharmaceutical dispenser. The dispenser can hold a predetermined number of pills, tablets, or capsules at one time. Since the canister arrangement can hold considerably more than the dispenser can, the canister is able to fill the dispenser to capacity multiple times before the canister must be refilled. The canister has a housing and one or more chambers in the housing. When a plurality of chambers is present, at least one of the chambers has a sloping floor at the bottom of the housing. A swinging door is disposed between each pair of adjacent chambers. The swinging door(s) are automatically activated when the dispensing apparatus senses that the dispenser and the previous chamber are both empty. An opening is also provided at the bottom of the housing. A sliding door covers the opening to prevent pills, tablets and capsules from exiting the housing. The sliding door is automatically opened upon the occurrence of an external condition, such as when the dispensing apparatus senses that the dispenser is empty.

19 Claims, 9 Drawing Sheets

Over all Canister Operation

CANISTER ARRANGEMENT FOR REFILLING PHARMACEUTICAL DISPENSER

FIELD OF THE INVENTION

The present invention relates to pharmaceutical dispensing apparatus and, more particularly, to a canister arrangement for refilling a pharmaceutical dispenser with pills, capsules, and tablets.

BACKGROUND OF THE INVENTION

In the field of automatic pharmaceutical and prescription dispensing, specifically in mail order and central fill applications, the facility is larger and the multiple steps to dispensing are spread out in space, time, and across more persons, than in a retail application. A closed and sealed system is preferred to transport drugs from a filling area to the dispenser. Since dispensers, canisters, or containers are not open, the opportunity for contamination is eliminated and the level of inventory control is increased. Removable, refillable canisters have been used to fulfill this function. These first canisters were nothing more than simple, box-like containers that mated with automatic pill-counting dispensers. As dispensing systems became more sophisticated, the price of medications increased, human error increased, malefactors proliferated, and the potency and contra-indications of the pharmaceuticals increased in quantity and severity. It has become clear that the original canisters lacked the safety and control that are needed and often legally required.

United States Published Patent Application No. 2006/0184271 for CARTRIDGE-LOADED AUTOMATIC PRESCRIPTION PILL DISPENSING SYSTEM AND DISPENSING UNIT AND CARTRIDGE FOR USE THEREIN, filed by Calvin J. Loveless on Nov. 23, 2005 and published on Aug. 17, 2006, discloses an automatic prescription pill dispensing unit that uses a cartridge in which prescription drugs are pre-loaded, preferably by a pharmacist, according to the user's medication regimen. This tamper-proof cartridge can be unlocked only by a pharmacist using a specially designed loading dock, or by inserting the cartridge into the user's dispensing unit.

U.S. Pat. No. 6,988,634 for CARTRIDGE FOR DISPENSING PILL OR CAPSULE-FORM MEDICATIONS IN DESIRED DOSES, issued to Reijo Varis on Jan. 24, 2006, discloses a dispensing device that includes a cartridge rotatable relative to a housing or frame and provided with discrete dosage compartments for desired doses of medication. Each separate dosage compartment of the cartridge is rotatable relative to the housing or frame to a dispensing point for the dose of medication. A signaling device producing a sound and/or light signal activates at pre-programmed times. An electronics unit contains a reprogrammable dispensing program. The cartridge is adapted to be disengaged from the dispensing device and to be transferred to a loading device, which fills the dosage compartments of the cartridge with desired doses of medication and furnishes the filled cartridge with identification data.

U.S. Pat. No. 6,119,892 for MODULAR POCKET MEDICATION DISPENSER, issued to Nerve Laurent et al. on Sep. 19, 2000, discloses a modular medication dispenser adapted to be held in a pocket and composed of two compartments containing electronics sufficient for memory, calculation and data retrieval relating to medication dispensing by a compartment. The main module also comprises visual data displays and alarms. At least one detachable additional compartment, comprising locking means and fasteners and forming a storage space for a given type of tablets, is detachably attached to the main module. The locking means and the fasteners of the preceding compartment cooperate with the fasteners and locking means of the next additional compartment. Each compartment comprises a drive means for a unit-dispensing component adaptable to different sizes of pharmaceutical medications.

U.S. Pat. No. 6,102,855 for VARIABLE CAPACITY MEDICATION CONTAINER AND LABELING SYSTEM FOR MEDICAL MONITORING DEVICE, issued to Bruce A. Kehr on Aug. 15, 2000, discloses a medical monitoring device, operating system, and method for managing administration of medical treatment regimens. The device stores medication schedule data, treatment data, patient query data, and patient response data. The device includes a controller for controlling modes of operation of the device, controlling access of the memory, controlling display of the treatment data and the patient query data on a display, receiving and processing patient response data, tracking timing, and providing scheduled medication alarm signals. The device provides scheduled medication alarm signals that alert the user concerning prescribed medications due to be taken. The device further includes removable trays of varying capacities.

U.S. Pat. No. 2,493,616, issued to Alexander Burns on Jan. 3, 1950, discloses a container carried by an individual for medicinal tablets.

These patents describe devices that are targeted for single or at most a couple of medications for a single user. They have differing levels of sophistication with features such as timers, alarms, locks, recording devices, data collection, etc. They have compartments to store medications for a day, week or perhaps longer. Some are filled by the user, some by a caregiver or pharmacist. These are end user devices, and do not describe solutions to the needs of centralized dispensing of thousands of prescriptions for thousands of persons.

Many facilities fill thousands of prescriptions for many customers, but they commonly have dispensing machines which have very limited capacity. The drugs that are most commonly prescribed require many replenishment routines per day to avoid running out of product. These refilling routines are a weak point in this process on two counts. First, it is a source of filling error. While bar codes have improved accuracy, there is still an element of human nature to shortcut established routines that are monotonous or tedious. An example would be where the replenishment of a dispenser requires a dozen small stock bottles. Rather than scanning each individual bottle, one bottle is scanned twelve times. One of the eleven bottles not scanned could be the right drug but the wrong dosage.

The second vulnerability is a source of inventory error, where the filling person scans a bottle of 2000 tablets but does not pour the whole bottle into the dispenser, or where a few tablets could be removed, thereby making the recorded inventory differ from the actual inventory.

What is needed in mail order/central fill applications is a design and a method to securely transport drug product from a secure filling area, under the supervision of a pharmacist, to the many dispensers on the production floor. A design should allow technicians, not a pharmacist, to perform the dispenser replenishment. This transport means should have a capacity of at least one dispenser-full, but could be several or many times the normal capacity of the dispenser.

The method should be closed, and at no time should product be exposed to possible contamination, spillage, or pilferage. The method should have a strict, rigid protocol that eliminates errors. The protocol should include as few steps as possible to prevent the impetus or motivation to skip steps.

To the extent possible, the dispenser and canister should automatically enhance the security of replenishment and actively prevent product mismatches, eliminating errors before they occur.

The general requirements for canister replenishment should include:

a) dispenser automatically closed and locked when canister removed;

b) canister automatically closed and locked when removed from dispenser or docking station;

c) canister sealed by pharmacist after filling and verifying;

d) canister automatically locked onto dispenser while in place;

e) safety systems in place in robotic applications so multiple, adjacent canisters can be removed for group replenishment;

f) illuminated indicator(s) visible to replenishment person for status;

g) clear top-filling access door so contents can be seen;

h) canister upright in docking station for re-filling;

i) canister sealed by pharmacist after filling and verifying;

j) seal not necessarily broken to install/dispense;

k) seal removed prior to next filling of canister;

l) canisters optionally of different sizes (capacities);

m) canister having electronics on-board;

n) canister adapted to "meter" product into dispenser:

controlled rate of dump (regulated door)

controlled quantity of dump (sections or partitions); and o) canister having external bar code and serial number.

It would be advantageous for a canister to be filled or at least verified by a registered pharmacist and then sealed, and then carried to the location of a dispenser and attached thereto by another person of lesser skill (and lower cost to the facility), such operations being performed so that neither the contents of the canister nor the contents of the dispenser can be accessed by the person who attaches the canister to the dispenser.

It would be advantageous for the canister to house electronics that contains information about the identity of the pharmaceutical, and that can communicate with similar electronics in the dispenser, in order to assure that the correct drug canister is being attached.

It would also be advantageous for the canister to have sensors to detect if the canister filling door has been compromised at any time away from the docking station, even when it is not connected to the dispenser. To alert the control system that a compromise has occurred and that the canister has to be returned to the pharmacist for re-verifying and a possible inventory check.

SUMMARY OF THE INVENTION

In accordance with the present invention, there is provided a canister for use with a pharmaceutical dispensing apparatus. The canister comprises a housing and optionally a number of chambers in the housing. At least one of the chambers has a sloping floor at the bottom of the housing. A swinging or sliding door or iris or other controlled aperture is disposed between each pair of adjacent chambers. The aperture is automatically activated by an electronic control when the dispensing apparatus senses that the dispenser is low and the previous chamber is empty. An opening is also provided at the bottom of the housing. A sliding door covers the opening to prevent pills, tablets and capsules from exiting the housing. An electronic control actuates the sliding door, which is automatically opened upon the occurrence of an external condition (e.g., when the dispensing apparatus senses that the dispenser is low).

BRIEF DESCRIPTION OF THE DRAWINGS

A complete understanding of the present invention may be obtained by reference to the accompanying drawings, when considered in conjunction with the subsequent, detailed description, in which.

DETAILED DESCRIPTION OF THE PREFERRED EMBODIMENT

Briefly, the present invention includes a canister for use with a pharmaceutical dispensing apparatus. The canister has a housing and one or more chambers in the housing. The housing can accept two types of canister: small and large. Canister 110 refers to the small canister. Canister 110' refers to the larger canister.

Figure 1:
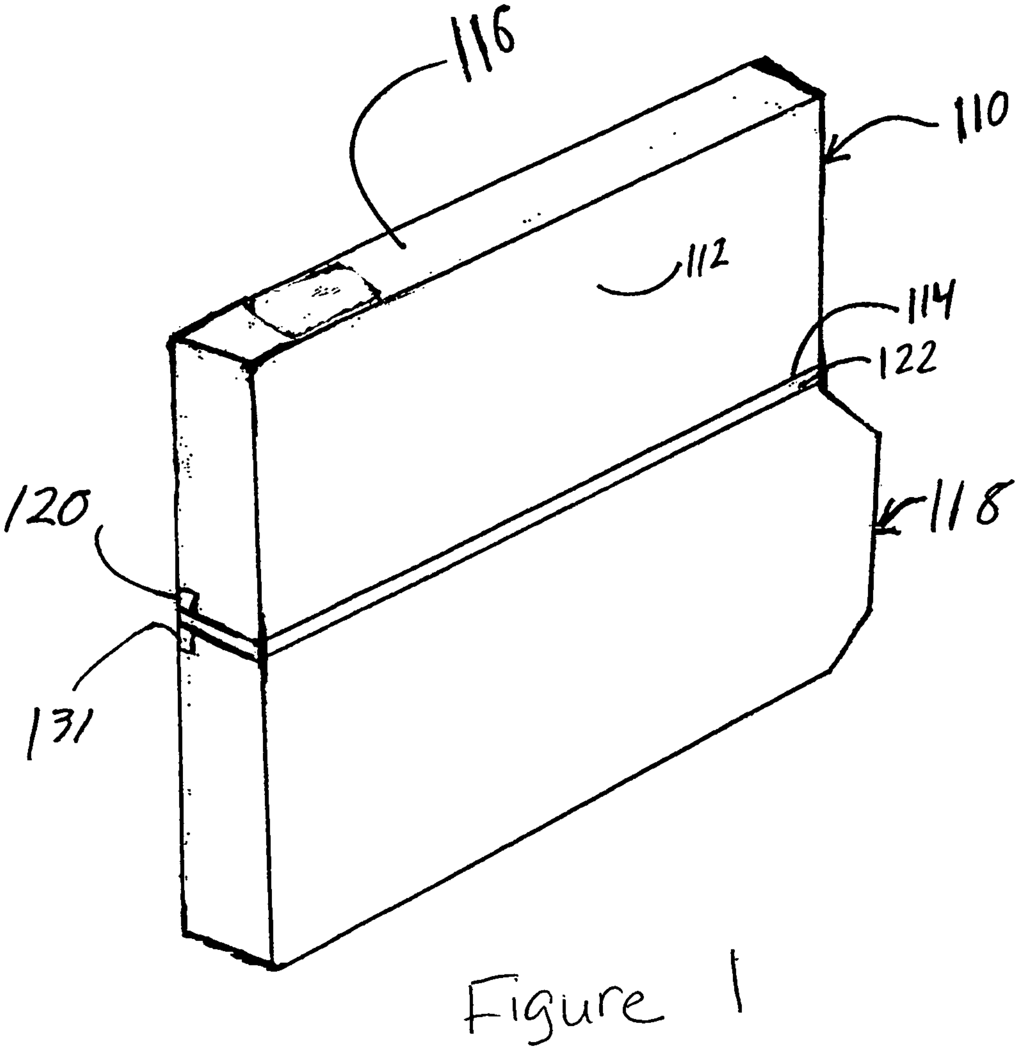
FIG. 1 is a perspective view of a small canister pharmaceutical dispensing apparatus housing in accordance with the present invention.

Referring now to FIG. 1, a small, immediate replacement canister 110 is formed by side plates 112 and bottom plate 114, and is covered with a loading door 116. Loading door 116 may be placed in the front or rear, or be side opening, depending on design preferences. A security switch, not shown, can be incorporated to monitor unauthorized or unexpected access.

When replenishment of a dispenser 118 is needed, a technician is directed to the correct dispenser bank and drawer by software. To aid in the replenishment process, light 131 indicates the specific dispenser in need of replenishment. At this point a new canister 110 is scanned for electronic identification, and if correct, the technician is given a cue to proceed.

Figure 1A:
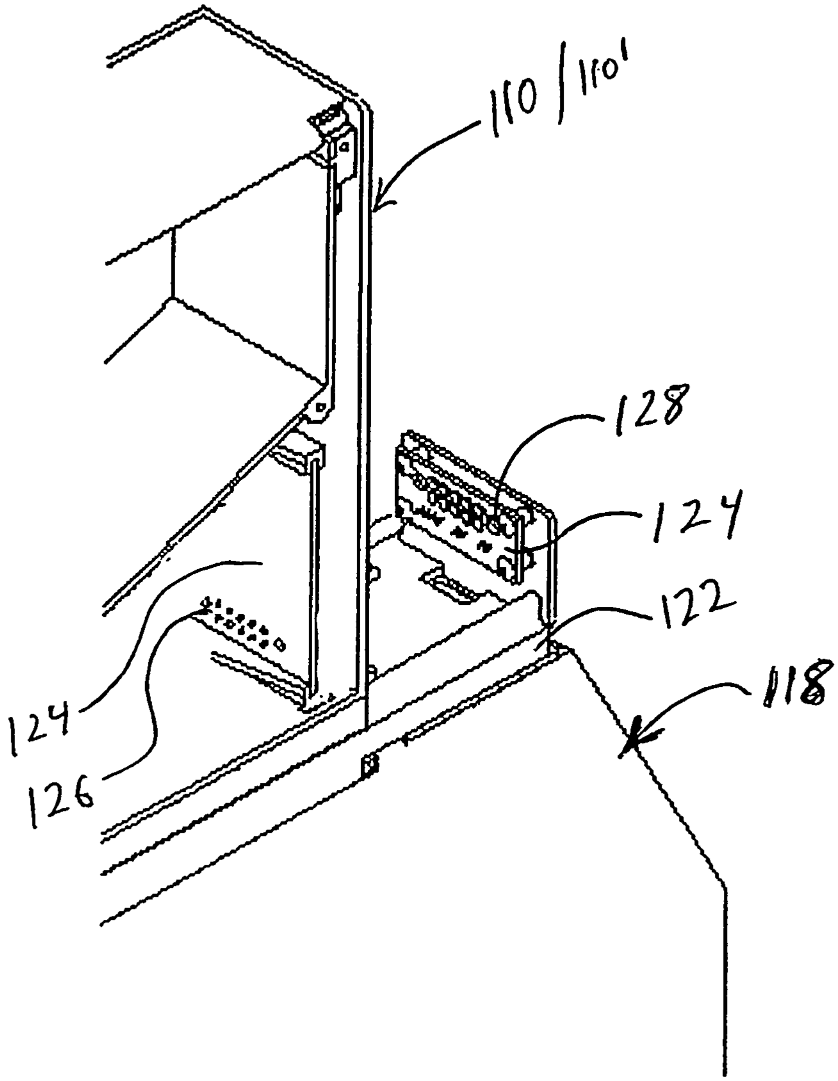
FIG. 1*a* is a detailed exploded view of the electrical connection of the canister and dispenser.

The canister 110 is mated with dispenser 118 with an interlocking adapter plate or slide 122 (FIG. 1), with one half of the slide 122 on the canister 110 and the mating half on the dispenser 118. At one end of the canister interlocking slide 122 is a block or plate 124 with electrical connecting pins 126. At the corresponding end of the dispenser 118 is likewise a block or plate 124 with electrical pads 128 (FIG. 1*a*). When canister 110 is slid onto dispenser 118 on the interlocking slide 122 to the fully installed position, electrical connecting pins 126 mate to electrical pads 128. The completion of these electrical connections allows power and communication between dispenser 118 and canister 110.

Figure 1B:
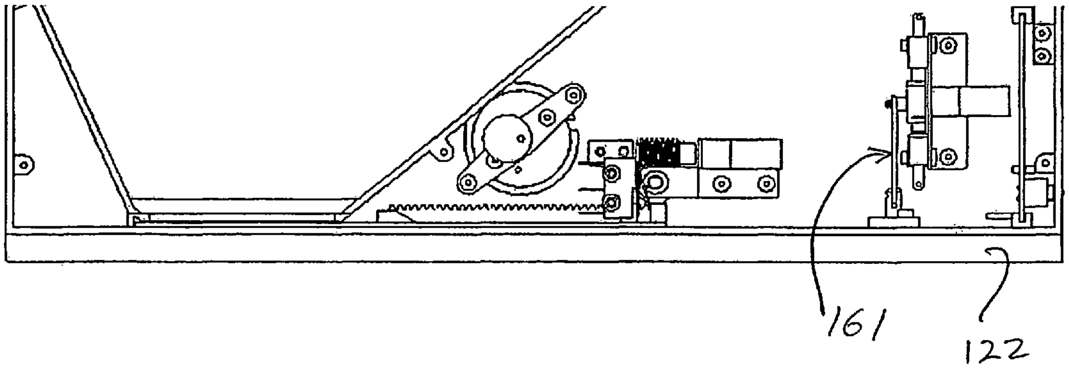
FIG. 1*b* is a detailed side view of the canister shown in FIG. 1 showing the locking mechanism.

Referring now to FIG. 1*b*, upon power-up of canister 110 the first action taken is actuation of locking mechanism 161.

Figure 2:
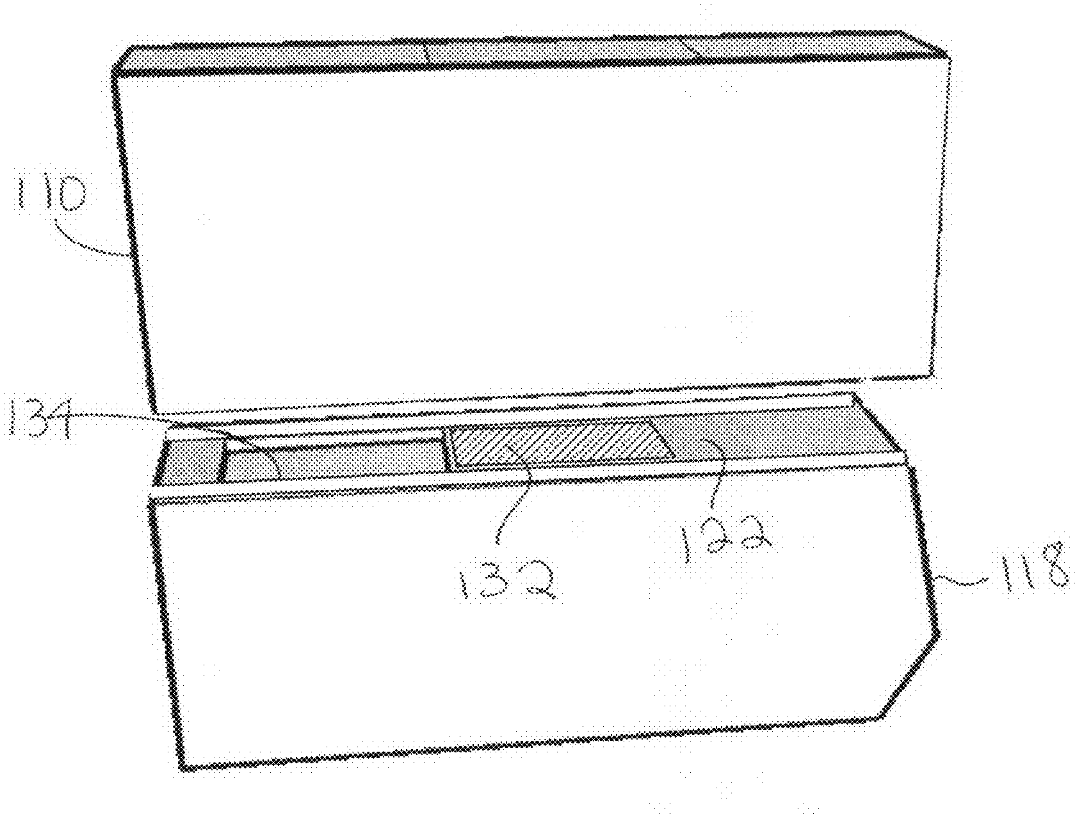
FIG. 2 is a perspective view of a multi-chamber canister arrangement and dispenser for use with a dispensing apparatus.

Locking mechanism 161 ties the canister 110 and dispenser 118 together until a microprocessor, not shown, unlocks them. A sensor or switch, not shown, confirms the locked status. Next, communication between dispenser 118 and canister 110 confirms the status of canister 110 as being full and verified and a match to the product in dispenser 118, see FIG. 2. If anything is amiss, canister 110 is unlocked and error light 120 is actuated. The software alerts the technician of the error. If everything is correct, dispenser 118 opens its sliding top door 132, exposing an opening or port 134.

Canister 110 likewise opens its sliding door 136 (FIG. 3) in the bottom plate 114 of canister 110, and product is able to fall via gravity, along with the assistance of electro-mechanical vibration, into dispenser 118. At this point in the normal replenishment process, doors 136, 132, respectively, of canister 110 and dispenser 118 are closed, switches or sensors confirm that doors 136, 132 are completely closed, and the microprocessor writes to the memory associated with canister 110 defining its state as empty. Canister 110 is unlocked from dispenser 118. The technician is alerted to remove empty canister 110.

Figure 3:
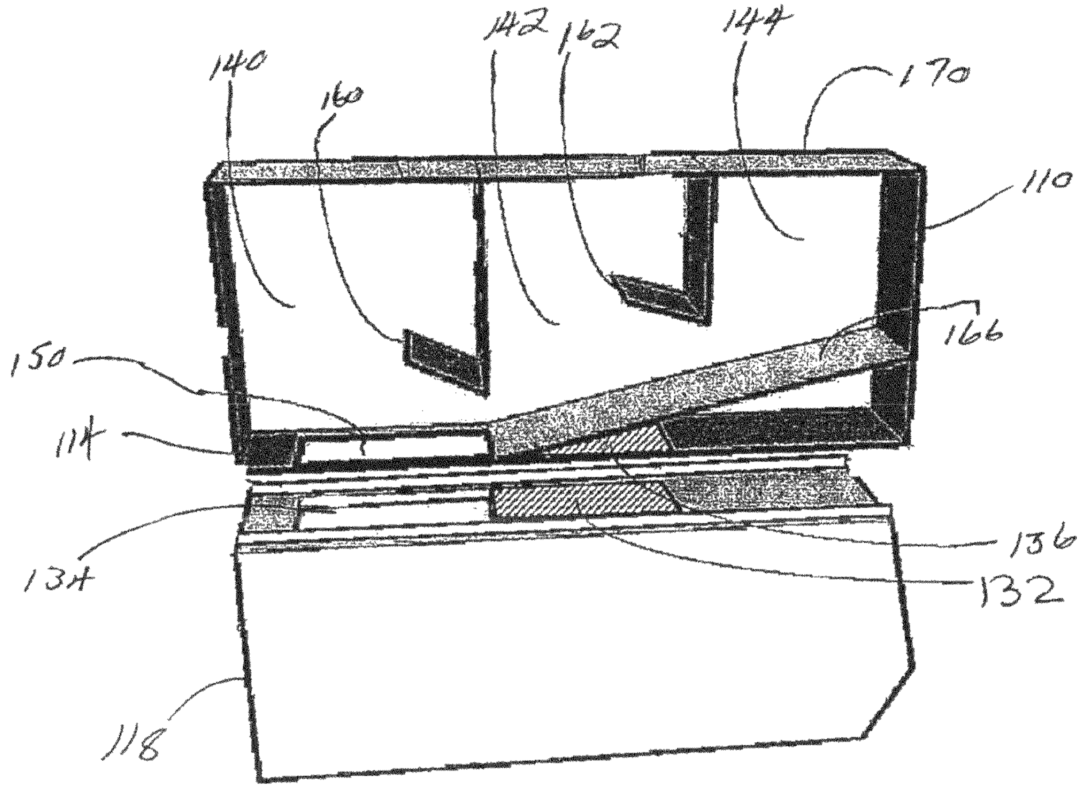
FIG. 3 is a perspective view of the multi-chamber dispensing apparatus showing a cut-away view of the canister.

Referring now to FIG. 3, a larger, multi-compartment or multi-chamber canister 110' of larger proportions is shown in relation to dispenser 118. Canister 110' carries several times the drug product volume of dispenser 118 and is intended to be left in place on dispenser 118 for an extended time, performing multiple replenishments of dispenser 118 under full automatic, autonomous control of dispenser 118. Canister 110' is divided into three compartments or chambers 140, 142, and 144. Each compartment 140, 142, 144 contains an amount of drug product that dispenser 118 can hold or satisfactorily accept. Compartments 140, 142, 144 allow canister 110' to carry much more product than the dispenser 118 can hold or satisfactorily accept at one time. If a canister 110' were to release a large amount of pills, comparable to the total amount therein, it would overload dispenser 118. Metering of drug product to dispenser 118 is accomplished by controlled releases of manageable volume. It should be understood that any number of compartments and release mechanisms could be implemented in this fashion, although three compartments 140, 142 and 144 are illustrated.

Canister 110' has an opening 150 at the bottom of first compartment 140. Opening 150 is positioned directly over a fill opening 134 of dispenser 118. Both canister 110' and dispenser 118 have sliding doors, 136 and 132, respectively, covering these respective openings 150, 134, controlled by microprocessors and motors, and which cannot be opened or accessed by a person from the outside. Canister 110' also has electrical connection comprising plate 124 with electrical connecting pins 126 (FIG. 1*a*). This links the canister to dispenser 118.

Also provided are a swinging door 160 between first and second compartments 140, 142 and swinging a door 162 between second and third compartments 142, 144. Swinging doors 160, 162 are individually electrically activated by means of a motor, not shown. Other mechanisms for providing the opening/closing function can also be used. For example, an aperture can be controlled by means of swinging doors, sliding doors, automated irises, and the like. Cams or solenoids can be used for release mechanisms. An external means, not shown, may be used to reset the position of the doors. The means for opening and closing the controlled aperture performs throttling thereof. A pivoting mechanism attached to side panel 112 allows a pharmacist or technician to reset swing doors 160, 162 upon replenishment of canister 110'.

Compartments 142, 144 have a common sloping floor 166, tilted preferably at 22° to the horizontal in the preferred embodiment, down which pills, tablets, or capsules, not shown, can flow. Sloping floor 166 can also be agitated or vibrated to facilitate movement of pills, capsules, and tablets thereover. Swinging doors 160, 162 are operable under electric motor control, but may also be spring-loaded to open and may be constrained by latches, not shown, which can be released under microprocessor control. A microprocessor or other electronic circuitry can be used to facilitate electrical communication between dispenser 118 and canister 110'.

In this embodiment of the invention, the final released compartment 144 can house the precise amount of drug to fill dispenser 118 to its ideal capacity. This ensures that nothing obstructs doors 132 and 136, allowing them to close after the contents are released from canister 110'. Once closed, canister 110' can be removed, leaving a substantial amount of drug within dispenser 118.

Figure 4:
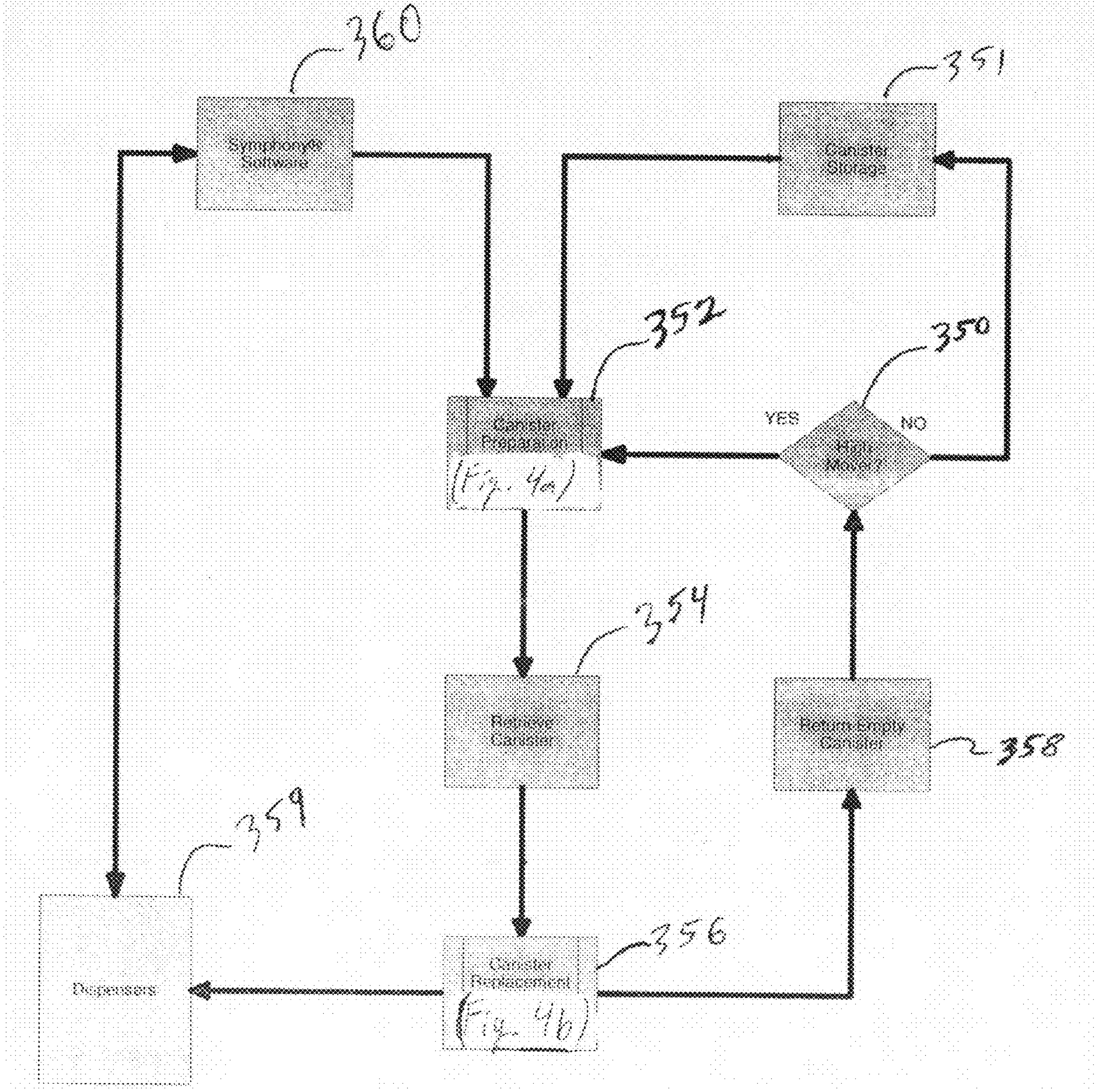
FIG. 4 is a flow chart of the overall operation of the pharmaceutical dispensing apparatus.
Figure 4A:
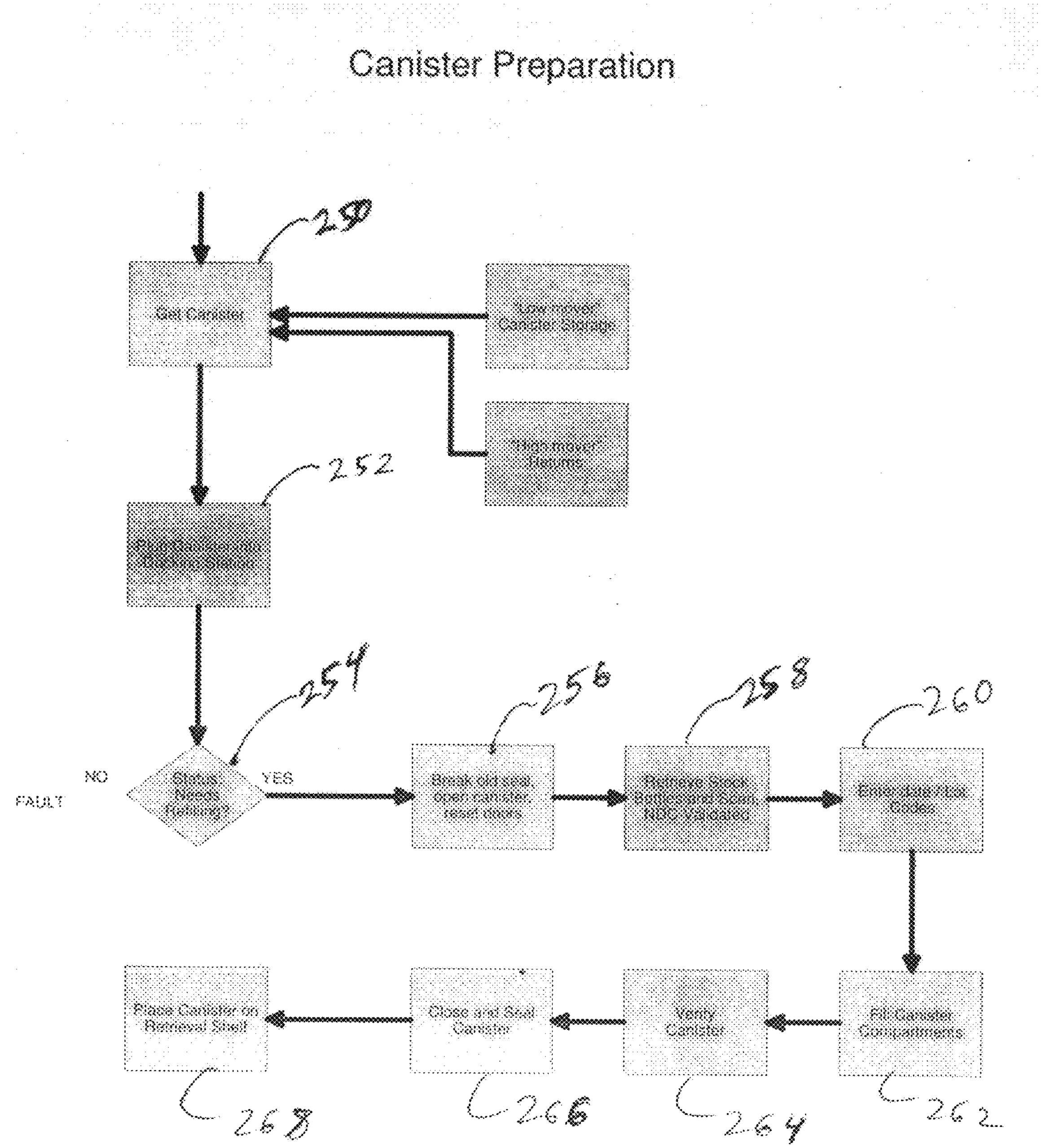
FIG. 4*a* is a flow chart of the canister preparation process.

Referring now to FIG. 4; the overall canister operation steps, including canister preparation and canister replacement steps, are shown starting with the return of an empty canister. If a canister is a "high mover", step 350, the canister preparation step 352, detailed in FIG. 4*a*, is initiated. If the canister is not a high mover, it is placed in storage, step 351. Once the canister preparation is complete, the canister is retrieved, step 354, and canister replacement, step 356 (detailed in FIG. 4*b*), is initiated. The canisters are brought to the dispensers, step 359, and once attached, controlled by Symphony® software, step 360. Empty canisters are returned, step 358, and either put into storage or prepared again.

Referring now to FIG. 4*a*, when an empty canister is ready to be replenished, it is retrieved, step 250, and plugged into a docking station, step 252. The canister is electronically checked to see if it must be refilled, step 254. The old seal is checked and broken and doors are reset, step 256. Filling technician retrieves stock bottles and scans and validates them, step 258. Information such as the date and lot codes is recorded, step 260. The filling technician then fills canister compartments, step 262. The canister is then verified, step 264, and then closed and sealed, step 266. The canister memory is updated with a new status, and a verifier ID recorded. The final step is to place the canister on the retrieval shelf, step 268.

Figure 4B:
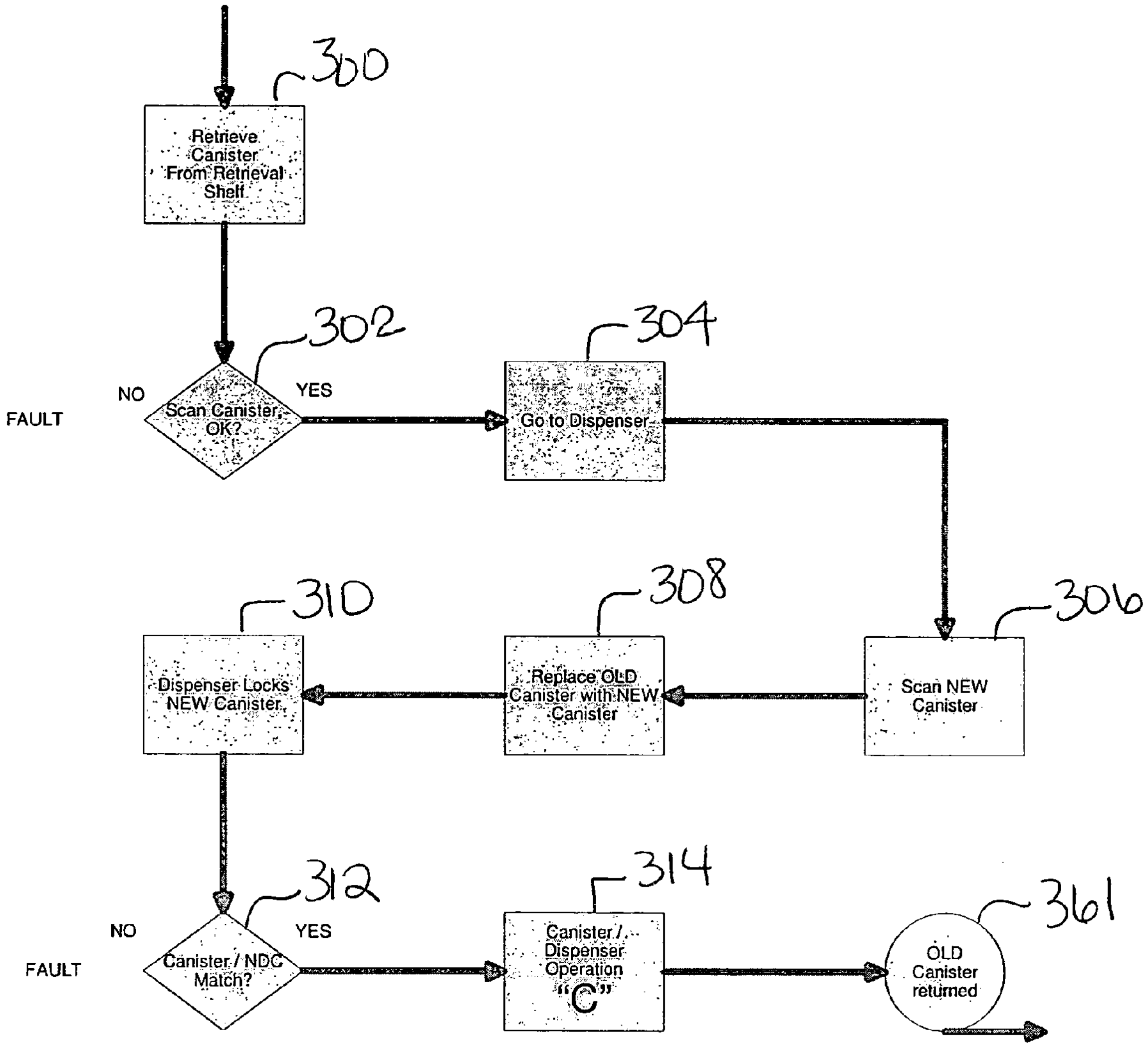
FIG. 4*b* is a flow chart of the canister replacement process.

Referring now to FIG. 4*b*, when a dispenser requires a replacement canister, a new canister is retrieved from the canister retrieval shelf, step 300. The new canister is then scanned, step 302, and brought to the dispenser, step 304. The new canister is also scanned at the dispenser, step 306. Once the new canister is scanned, the old canister is replaced with the new canister, step 308. A locking mechanism then locks the new canister to the dispenser, step 310, and a microprocessor checks the NDC number of the contents, step 312. If the NDC number of the contents of the canister matches that of the dispenser, Canister/Dispenser Operation, step 314 (detailed in FIG. 4*c*), is initiated. Upon initiation of step 314, the old canister is returned, step 316.

Figure 4C:
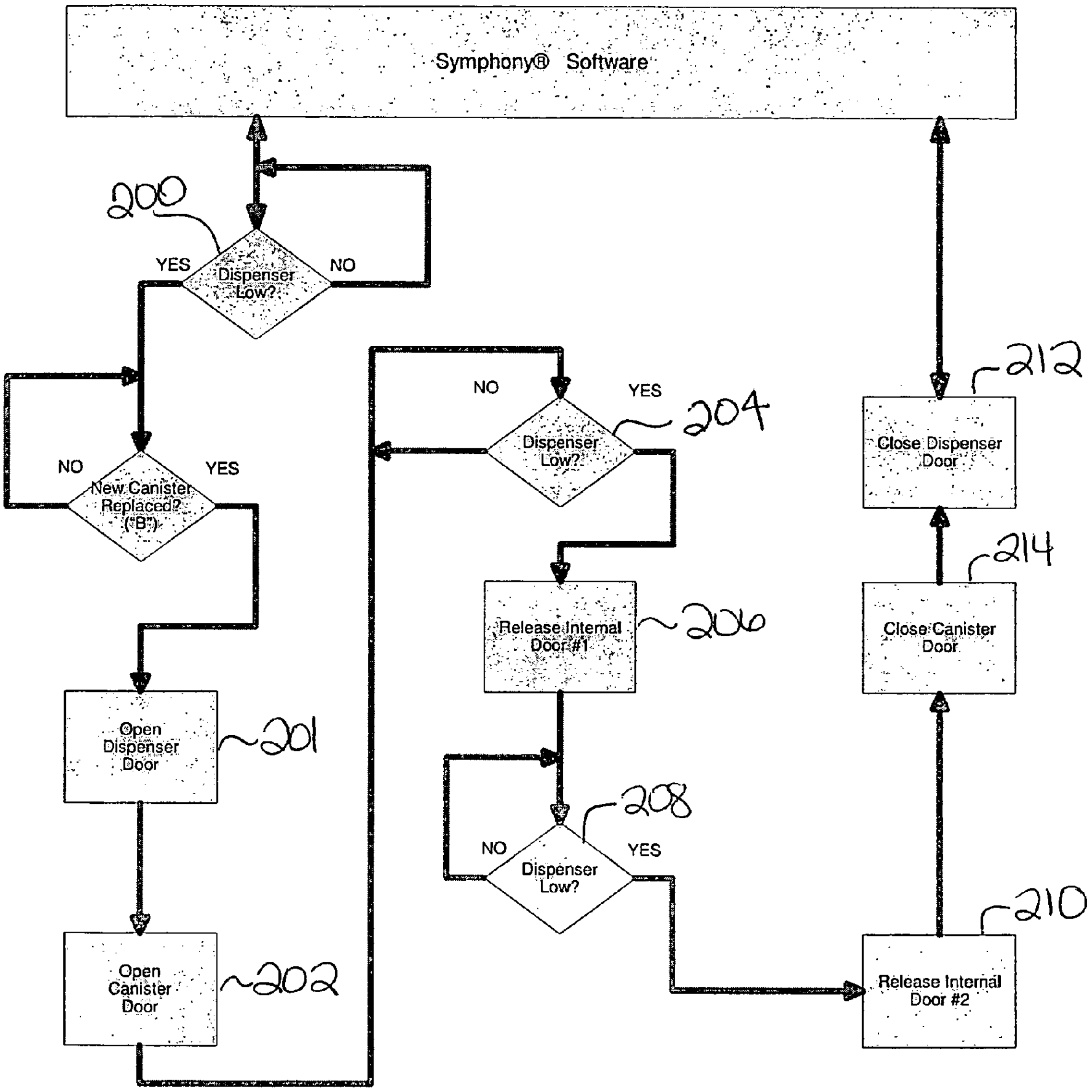
FIG. 4*c* is a flow chart detailing the operations of the inventive multi-chamber pharmaceutical dispensing apparatus.

Referring now to FIG. 4*c*, in operation, when a dispenser senses that the amount of drug, not shown, in its internal hopper is low, step 200, its microprocessor signals a microprocessor in a multi-chamber canister. Doors being closed, sliding door over dispenser opening is opened, step 201, sliding door over opening canister is opened, step 202, and the drug in first compartment drops into the dispenser through its fill opening. When dispenser again senses that its drug content is low, step 204, first swinging door is released and the contents of second compartment move along sloping floor and drop into dispenser, step 206. When dispenser again senses that its drug content is low, step 208, second swinging door is opened and the contents of third compartment move along sloping floor and drop into dispenser, step 210. The microprocessor of dispenser then commands dispenser door to close, step 212. Simultaneously, the microprocessor in canister writes to the memory associated with canister defining its state as empty, and closes canister door, step 214. Switches or sensors, not shown, confirm that doors are completely closed.

The controlling software is informed of the new canister state and canister is unlocked from dispenser, step 214. The controlling software opens the window of opportunity for replacement of this large canister, and the dispenser has a full hopper with which to dispense drug product, extending this time window to the maximum.

Empty canister is returned to a secure canister filling area or room, step 316. The integrity of the drug supply is thereby preserved from theft, vandalism, or contamination.

In other words, the following steps are performed for refilling canister 110':

1. Plug canister 110' into docking station. Docking station communicates with canister 110', reads canister ID, and checks for canister status of "Needs Replenishment." Screen displays product and quantity to be used.

2. Previous seal is checked, cut and removed; door 170 is opened.

3. Products are retrieved. Filler technician is prompted to scan each stock bottle. Software confirms ("accepts") each scanned stock bottle up to maximum capacity. Filler is prompted to enter Lot Codes and Expiration Dates.

4. Interior swinging compartment doors 160, 162 are reset to the closed position.

5. Filler technician pours stock bottles into canister 110'.

6. Filler technician closes filling door 170. Software changes canister status to "Needs Verification" if filler technician does not have verification rights. Software changes canister status to "Ready" if filler technician has verification rights.

The actions for verifying canister 110' must be performed by someone with verification rights, as follows.

1. Plug canister 110' into docking station, if not already in place. Docking station communicates with canister 110', reads canister ID, and checks for canister status of "Needs Verification".

2. Verifier opens filling door 170, reviews the product information, and closes filling door 170. If the user does not accept the refilled product, canister 110' is marked as "Product Mismatch" and moves it to a canister problem area. If the user accepts the refilled product, canister 110' is marked as "Ready."

3. Verifier signs and seals canister 110', and moves the canister 110' to the staging area.

The following steps are performed for re-filling small, single-chamber canister 110:

1. Plug canister 110 into docking station. Docking station communicates with canister 110, reads canister ID, and checks for canister status of "Needs Replenishment." Screen displays product and quantity to be used.

2. Previous seal checked, cut and removed, door 116 opened.

3. Products are retrieved. Filler technician is prompted to scan each stock bottle, not shown. Software confirms ("accepts") each scanned stock bottle up to maximum capacity. Filler technician is prompted to enter Lot Codes and Expiration Dates.

4. Filler technician pours stock bottles into canister 110.

5. Filler technician closes filling door 116. Software changes canister status to "Needs Verification" if filler does not have verification rights. Software changes canister status to "Ready" if filler has verification rights.

The actions for verifying the canister 110 must be performed by someone with verification rights, as follows.

1. Plug canister 110 into docking station, if not already in place. Docking station communicates with canister 110, reads canister ID, and checks for canister status of "Needs Verification".

2. Verifier opens filling door 116, reviews the product information, and closes filling door 116. If the user does not accept the refilled product, canister 110 is marked as "Product Mismatch" and moves it to the canister problem area. If the user accepts the refilled product, canister 110 is marked as "Ready."

3. Verifier signs and seals the canister 110, and moves the canister 110 to the staging area.

The actions for replenishing dispenser are as follows.

1. Dispenser/canister locations with low product level are flagged by software. The dispenser indicator lamp 131 signals the empty condition (e.g., steady green).

2. Dispenser/canister locations with low product level have a status of "Needs Replenishment."

3. The user goes to the dispenser bank location for replenishment.

4. The user selects the dispenser 118 for replenishment by scanning the dispenser or is directed by software.

5. The user scans a canister 110' or 110. If correct, user gets on-screen confirmation. If incorrect, user gets on-screen warning.

6. The user picks the correct new canister 110' or 110 and places it in a ready stage on a cart.

7. The software causes the dispenser indicator 131 to flag (e.g., flashing green) the correct dispenser 118, and unlocks the old canister 110' or 110.

8. The user removes the old spent canister 110' or 110 from dispenser 118 and places it in the "empty" shelf of the cart. The user places new canister 110' or 110 onto the dispenser 118.

9. The dispenser 118 locks canister 110' or 110, communicates with canister 110' or 110 and checks the ID for a product match and a "Ready" status. If correct, the status light 131 changes to steady green and dispenser/canister goes on-line. If incorrect, the user sees a warning and status light 120 goes to flashing red (error).

The red indicator light 120 has the following meanings.

Alert for wrong canister/error: flashing red

Alert for empty canister: steady red.

The green indicator light 131 has the following meanings

Indicator for okay: steady green

Indicator for replacement: flashing green.

Under normal operation, no lights are lit. It should be understood that other indicating means can be used in addition or instead of red and green indicator lights 120, 131, as aforementioned. For example, one indicator light with the ability to display different colors and modes can be used, or one or more indicator lights, each of which displaying different colors or modes. Also, sounds can be used as indicator means on the dispenser and/or canister.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this inventive method.

Having described the invention, what is desired to be protected by Letters Patent is presented in the subsequent appended claims.

What is claimed is:

1. A canister for use with a pharmaceutical dispensing apparatus comprising:
- a) a housing;
- b) a plurality of chambers in said housing, at least one of said plurality of chambers having a sloping floor at a lower extremity thereof;
- c) a controlled aperture disposed between each pair of adjacent ones of said chambers;
- d) a controller operatively connected to said controlled aperture and to said plurality of chambers for determining whether objects disposed in at least one of said plurality of chambers are to be refilled in bulk for eventual dispensing therefrom; and
- e) an opening at a lower extremity of said housing.

2. The canister for use with a pharmaceutical dispensing apparatus in accordance with claim 1, further comprising:
- f) a sliding door covering said opening to prevent pills, tablets and capsules from exiting said housing.

3. The canister for use with a pharmaceutical dispensing apparatus in accordance with claim 2, further comprising:
- g) means for actuating said sliding door automatically upon the occurrence of an external condition.

4. The canister for use with a pharmaceutical dispensing apparatus in accordance with claim 1, wherein said plurality of chambers comprises three chambers and said controlled aperture disposed between each pair of adjacent ones of said chambers comprises two swinging doors.

5. A pharmaceutical dispensing subunit comprising:
- a) a canister comprising:
  - i) a first housing;
  - ii) a plurality of chambers in said first housing, at least one of said plurality of chambers having a sloping floor at a lower extremity thereof;
  - iii) a controlled aperture disposed between each pair of adjacent ones of said chambers;
  - iv) a controller operatively connected to said controlled aperture and to said plurality of chambers for determining whether objects disposed in at least one of said plurality of chambers are to be refilled in bulk for eventual dispensing therefrom; and
  - v) a first opening at a lower extremity of said housing; and
- b) a dispenser comprising:
  - i') a second housing; and
  - ii') a second opening disposed at an upper extremity of said second housing, said second opening being in operative relationship with said first opening of said canister, whereby pills, tablets and capsules disposed in said canister are automatically transferred to said dispenser upon the occurrence of an external condition.

6. The pharmaceutical dispensing subunit in accordance with claim 5, further comprising:
- c) a first sliding door covering said first opening to prevent pills, tablets and capsules from exiting said first housing; and
- d) a second sliding door covering said second opening to prevent pills, tablets and capsules from entering said second housing.

7. The pharmaceutical dispensing subunit in accordance with claim 6, further comprising means for actuating said first and second sliding doors automatically upon the occurrence of an external condition to effect transfer of pills, tablets and capsules from said canister to said dispenser.

8. The pharmaceutical dispensing subunit in accordance with claim 5, wherein said plurality of chambers comprises three chambers and said swinging door disposed between each pair of adjacent ones of said chambers comprises two controlled apertures.

9. The pharmaceutical dispensing subunit in accordance with claim 8, further comprising:
- c) means for actuating each of said controlled apertures automatically upon sensing said external condition.

10. The canister for use with a pharmaceutical dispensing apparatus in accordance with claim 1, wherein each of said plurality of chambers has a total capacity greater than the volume of a dispenser and at least one of said plurality of chambers has a capacity no greater than the capacity of said dispenser.

11. The canister for use with a pharmaceutical dispensing apparatus in accordance with claim 2, wherein control of said sliding door is automatic.

12. The canister for use with a pharmaceutical dispensing apparatus in accordance with claim 10, further comprising:
- e) means for communicating between said dispenser and said canister;
- f) means for locking said canister to said dispenser;
- g) external indicator means; and
- h) a loading door.

13. The canister for use with a pharmaceutical dispensing apparatus in accordance with claim 12, further comprising:
- i) internal tamper evident indicator means operatively connected to said loading door; and
- j) external tamper evident indicator means operatively connected to said loading door.

14. The canister for use with a pharmaceutical dispensing apparatus in accordance with claim 10, further comprising:
- e) means operatively connected to said electronic control for internal identification of pills, tablets and capsules.

15. The canister for use with a pharmaceutical dispensing apparatus in accordance with claim 10, further comprising:
- e) means operatively connected to said electronic control for external identification.

16. A canister for use with a pharmaceutical dispensing apparatus comprising:
- a) a housing;
- b) a chamber in said housing;
- c) a loading door;
- d) a dispenser having means for determining whether objects disposed in said chamber are to be refilled in bulk for eventual dispensing thereby; and
- e) an electrical connector to establish communications between said canister and a dispenser.

17. The canister for use with a pharmaceutical dispensing apparatus in accordance with claim 16, further comprising:
- f) an opening at the lower extremity of said housing; and
- g) a sliding door covering said opening to prevent pills, tablets and capsules from exiting said housing.

18. The canister for use with a pharmaceutical dispensing apparatus in accordance with claim 16, wherein said canister has a capacity no greater than the volume of a dispenser.

19. The canister for use with a pharmaceutical dispensing apparatus in accordance with claim 16, further comprising:
- f) means for communicating between said canister and said dispenser;
- g) means for locking said canister to said dispenser;
- h) external indicator means;
- i) internal tamper evident indicator means operatively connected to said loading door; and i) external tamper evident indicator means operatively connected to said loading door.

* * * * *